United States Patent
Shariat et al.

(10) Patent No.: US 10,163,130 B2
(45) Date of Patent: Dec. 25, 2018

(54) METHODS AND APPARATUS FOR IDENTIFYING A COOKIE-LESS USER

(71) Applicant: Amobee, Inc., Redwood City, CA (US)

(72) Inventors: Shahriar Shariat, Redwood City, CA (US); Sumit Rangwala, Fremont, CA (US); Ali Dasdan, San Jose, CA (US)

(73) Assignee: Amobee, Inc., Redwood City, CA (US)

( * ) Notice: Subject to any disclaimer, the term of this patent is extended or adjusted under 35 U.S.C. 154(b) by 892 days.

(21) Appl. No.: 14/551,475

(22) Filed: Nov. 24, 2014

(65) Prior Publication Data

US 2016/0148255 A1     May 26, 2016

(51) Int. Cl.
    *G06Q 30/02*     (2012.01)
    *H04L 29/08*     (2006.01)

(52) U.S. Cl.
    CPC ..... *G06Q 30/0255* (2013.01); *G06Q 30/0275* (2013.01); *H04L 67/20* (2013.01); *H04L 67/22* (2013.01); *H04L 67/306* (2013.01)

(58) Field of Classification Search
    CPC ....................................... G06Q 30/02–30/0277
    See application file for complete search history.

(56) References Cited

U.S. PATENT DOCUMENTS

| | | |
|---|---|---|
| 7,849,027 B2 | 12/2010 | Koran et al. |
| 8,725,570 B2 | 5/2014 | Doughty et al. |
| 2003/0083938 A1* | 5/2003 | Smith .................... G06Q 30/02 705/14.53 |
| 2006/0173744 A1 | 8/2006 | Kandasamy et al. |
| 2007/0282785 A1 | 12/2007 | Fayyad et al. |
| 2008/0294497 A1 | 11/2008 | Simons et al. |

(Continued)

FOREIGN PATENT DOCUMENTS

WO     WO 2013181673 A1 * 12/2013 ............. G06Q 30/08

OTHER PUBLICATIONS

Adtruth. "When Device Recognition and Programmatic Buying Intersect". Jul. 2013 [retrieved on Aug. 31, 2018]. Retrieved from Internet: <URL: https://www.mmaglobal.com/files/casestudies/When_Device_Recognition_and_Programmatic_Buying_Intersect%5B1%5D.pdf> (Year: 2013).*

(Continued)

*Primary Examiner* — Fonya M Long
*Assistant Examiner* — Bion A Shelden
(74) *Attorney, Agent, or Firm* — Kwan & Olynick LLP

(57) ABSTRACT

Methods and apparatus for identifying on-line users for advertisement or content targeting are disclosed. Historical user data is obtained in association with user identifiers, which have been unambiguously determined. The historical user data includes event data for one or more on-line user events that have occurred for each user identifier. The historical user data also specify fingerprint vectors of characteristic values that are each associated with specific ones of the user identifiers. A current one of the fingerprint vectors that is ambiguously associated with two or more user identifiers is received. A first user identifier is selected from the associated two or more user identifiers of the current fingerprint vector based on the event data of the historical user data. The selected first user identifier is provided to a server configured to provide advertisement or content based on user profile data that is obtainable for such selected first user identifier.

17 Claims, 9 Drawing Sheets

(56) References Cited

U.S. PATENT DOCUMENTS

| | | | |
|---|---|---|---|
| 2010/0042421 A1 | 2/2010 | Bia et al. | |
| 2010/0042501 A1* | 2/2010 | Lee | G06Q 30/0255 705/14.53 |
| 2010/0100618 A1* | 4/2010 | Kuhlke | H04L 67/22 709/224 |
| 2010/0332331 A1* | 12/2010 | Etchegoyen | G06Q 30/02 705/14.69 |
| 2011/0218860 A1 | 9/2011 | Barber | |
| 2012/0109956 A1* | 5/2012 | Ramaiyer | G06F 17/30867 707/737 |
| 2013/0054433 A1 | 2/2013 | Giard et al. | |
| 2013/0124309 A1 | 5/2013 | Traasdahl et al. | |
| 2013/0124330 A1 | 5/2013 | Doughty et al. | |
| 2014/0074614 A1* | 3/2014 | Mehanian | G06Q 30/0267 705/14.64 |
| 2014/0304087 A1* | 10/2014 | Himrod | G06Q 30/0275 705/14.71 |
| 2014/0310159 A1* | 10/2014 | Zoldi | G06Q 20/4016 705/39 |
| 2015/0073909 A1 | 3/2015 | Peden et al. | |
| 2016/0117736 A1 | 4/2016 | Dasdan et al. | |

OTHER PUBLICATIONS

"U.S. Appl. No. 14/185,092, Examiner Interview Summary dated Jul. 28, 2014", 3 pgs.

"U.S. Appl. No. 14/185,092, Final Office action dated Sep. 11, 2014", 28 pgs.

"U.S. Appl. No. 14/185,092, Non Final Office Action dated Apr. 22, 2014", 34 pgs.

"U.S. Appl. No. 14/185,118, Examiner Interview Summary dated Jul. 31, 2014", 3 pgs.

"U.S. Appl. No. 14/185,118, Final Office Action dated Sep. 12, 2014", 21 pgs.

"U.S. Appl. No. 14/185,118, Non Final Office Action dated Apr. 24, 2014", 33 pgs.

"U.S. Appl. No. 14/248,085, Examiner Interview Summary dated Oct. 10, 2014", 3 pgs.

"U.S. Appl. No. 14/248,085, Non Final Office Action dated Jun. 13, 2014", 14 pgs.

"Locality-sensitive hashing", Wikipedia, Retrieved from the Internet: <http://en.wikipedia.org/wiki/Locality-sensitive_hashing>, Accessed on Jul. 10, 2014, 8 pgs.

Xu, Jin H. et al., "Web User Clustering Analysis based on KMeans Algorithm", ICINA, 2010, V2-6-V2-9.

"U.S. Appl. No. 14/524,916, Non Final Office Action dated May 12, 2017", 15 pgs.

Croce, Danilo, "Clustering", Retrieved from the Internet: http://www.uniroma2.it/didattica/Wml R/deposito/clustering_2011.pdf, 55 pages.

Eckersley, Peter, "How Unique is Your Web Browser?", P. Eckersley, How unique is your web browser?, Privacy Enhancing Technology Symposium. 2006, 19 pages.

Kohno, Tadayoshi et al., "Remote Physical Device Fingerprinting", T. Kohno, A. Broido, and K. Claffy, Remote physical device fingerprinting. IEEE Symposium on Security and Privacy, 2005, 15 pages.

Mayer, J. R. , ""Any person . . . a pamphleteer" Internet Anonymity in the Age of Web 2.0", J. R. Mayer, Any person . . . a pamphleteer, Internet anonymity in the age of Web 2.0. Senior thesis, Stanford, 2009, Apr. 7, 2009, 103 pages.

Yen, Ting-Fang et al., "Host Fingerprinting and Tracking on the Web: Privacy and Security Implications", T. Yen, Y. Xie, F. Yu, R. P. Yu, and M. Abadi. "Host Fingerprinting and Tracking on the Web: Privacy and Security Implications.", NDSS, 2012, 16 pages.

\* cited by examiner

| User ID | User Attributes ||| Events |||
| --- | --- | --- | --- | --- | --- | --- |
| | Gender | Age | Fingerprint Vector | Impression | Interaction | Engagement |
| U1 | F | 33 | fv1 | Imp1, ts1 | Click, ts2 | - |
| U2 | - | 22 | fv2 | Imp1, ts3 | Conv., ts4 | - |
| U3 | - | 45 | fv3 | - | - | - |
| U4 | - | - | fv1 | - | - | Content1, ts5 |
| U5 | - | - | fv1 | - | - | Content2, ts6 |
| ⋮ | ⋮ | ⋮ | ⋮ | ⋮ | ⋮ | ⋮ |

*Figure 4A*

| User ID | Current Frequency | Current Recency (s) |
| --- | --- | --- |
| U1 | 5 | 5 |
| U2 | 100 | 10 |
| U3 | 200 | 20 |
| U4 | 1001 | 9 |

*Figure 4B*

| Fingerprint Vector | User List |
| --- | --- |
| fv1 | U1, U3, U4 |
| fv2 | U2, U8, U9, U15 |
| fv3 | U20, U25, U26, U27 |
| fv4 | U5 |

*Figure 4C*

| Recency (s) | Frequency (count) ||||||
| --- | --- | --- | --- | --- | --- | --- |
| | 1-5 | 6-10 | 11-15 | 16-20 | 21-25 | 26-30 |
| 1-2 | 5 | 100 | 500 | 5 | 0 | 3 |
| 3-4 | 15 | 50 | 20 | 1 | 0 | 4 |
| 5-6 | 5 | 200 | 100 | 5 | 5 | 5 |
| 7-8 | 25 | 10 | 0 | 0 | 0 | 1 |
| 9-10 | 10 | 100 | 1 | 0 | 5 | 5 |

*Figure 4D*

METHODS AND APPARATUS FOR IDENTIFYING A COOKIE-LESS USER

TECHNICAL FIELD OF THE INVENTION

The present invention relates to on-line advertising and marketing, and more specifically to identifying users and the like.

BACKGROUND

In online advertising, internet users are presented with advertisements as they browse the internet using a web browser. Online advertising is an efficient way for advertisers to convey advertising information to potential purchasers of goods and services. It is also an efficient tool for non-profit/political organizations to increase the awareness of their organizations by delivery of media to a target group of people.

Marketing campaigns are often set up with a goal to increase brand awareness by exposing particular users to particular marketing media through publisher sites. For instance, users may become aware of a particular brand of pickles after repeatedly being exposed to a particular campaign's advertisement. Additionally, marketing campaigns are often directed towards a particular audience segment whose users are most likely to purchase or use the particular product or service that is being marketed. In general, marketing campaigns seek to have a particular number or target range of exposures to certain targeted people.

In order to target a particular user segment, techniques are continuously being developed for accurately identifying users and their associated user profile data.

SUMMARY OF THE INVENTION

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In general, certain embodiments of the present invention provide mechanisms for identifying on-line users for advertisement or content targeting. In one embodiment, by a data management system that includes a plurality of distributed processors, historical user data is obtained in association with a plurality of user identifiers, which have been unambiguously determined. The historical user data includes event data for one or more on-line user events that have occurred for each user identifier. The historical user data also specify a plurality of fingerprint vectors of characteristic values that are each associated with specific ones of the user identifiers. By a user detector system that is configured to facilitate on-line advertisement or content targeting, a current one of the fingerprint vectors that is ambiguously associated with two or more user identifiers is received. By the user detector system, a first user identifier is selected from the associated two or more user identifiers of the current fingerprint vector based on the event data of the historical user data. The selected first user identifier is provided to a server configured to provide advertisement or content based on user profile data that is obtainable for such selected first user identifier.

In a specific aspect, the first user identifier is selected based on a determination that the first user identifier has a highest probability of being the correct user identifier than a probability of the other ones of the two or more user identifiers being the correct user identifier. In a further aspect, the first user identifier is selected based on a determination that the first user identifier has a highest probability of being previously unambiguously identified with a user or device from which the current fingerprint vector is received.

In a specific implementation, the first user identifier is selected by determining from the historical user data a frequency of events for each of the two or more user identifiers and selecting a highest frequency and its associated user identifier. In a further aspect, the highest frequency is selected from two or more same highest frequencies based on a recency parameter that is obtained from the historical user data for the two more user identifiers having the two or more same highest frequencies.

In another embodiment, the first user identifier is selected by (i) tracking a count of user identifiers for each of a plurality of pairs of frequency and recency values, (ii) for each user identifier associated with the current fingerprint vector, determining a frequency count by incrementing such user identifier's last frequency count of events as determined from the historical user data and determining a recency value by determining a difference between a time of the current fingerprint data and a last time of an event associated with such user identifier as specified in the historical user data, and (iii) for each user identifier, determining a probability of such user identifier by dividing a total count of user identifiers having such user identifier's frequency count and recency value by a total number of user identifiers for which counts are tracked.

In an alternative implementation, the first user identifier is selected by (i) training a parametric model to estimate a distribution of joint probability of frequency and recency value for events associated with the plurality of user identifiers in the historical user data and (ii) for each of the two or more user identifiers associated with the current feature vector, determining a probability of such user identifier by inputting a recency and frequency value of such user identifier into the parametric model, which outputs the selected first user identifier. In a further aspect, the training is performed by an expectation maximization process or a Gibbs sampling process.

In a further aspect, the current fingerprint vector is received with an advertisement bid request for an advertisement space in on-line content that is to be presented to a requesting user device associated with the current feature vector. In this aspect, the method includes (i) obtaining user profile and event data that is associated with the selected first user identifier and (ii) providing a bid for an advertisement to be presented to the requesting user device based on the obtained user profile and event data meeting specified targeting constraints.

In another embodiment, the invention pertains to a system having at least a processor and a memory. The processor and/or memory are configured to perform one or more of the above described operations. In another embodiment, the invention pertains to at least one non-transitory computer readable storage medium having computer program instructions stored thereon that are arranged to perform one or more of the above described operations.

These and other features of the present invention will be presented in more detail in the following specification of certain embodiments of the invention and the accompanying figures which illustrate by way of example the principles of the invention.

BRIEF DESCRIPTION OF THE DRAWINGS

FIG. 4A illustrates a simple data structure that is representative of users and their associated user data.

FIG. 4B is a table for associating user ID's with current frequency and recency values in accordance with one example implementation of the present invention.

FIG. 4C is a table that associates feature vectors with user ID's in accordance with a specific example implementation of the present invention.

FIG. 4D is an example table for tracking user ID counts for pairs of recency and frequency values in accordance with one embodiment of the present invention.

DETAILED DESCRIPTION OF THE SPECIFIC EMBODIMENTS

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to the embodiments.

Figure 1:
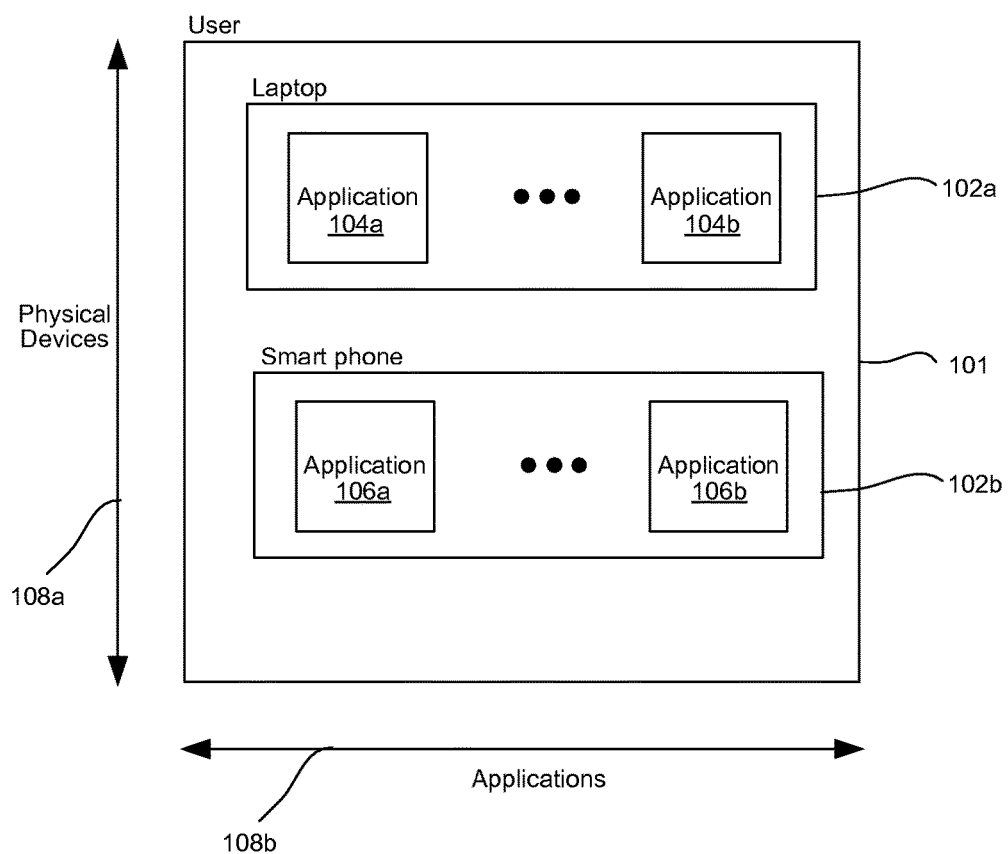
FIG. 1 is a diagrammatic representation of typical objects that can be associated with a human user.

FIG. 1 is a diagrammatic representation of typical objects that can be associated with a human user. As shown, a particular user can be associated with various user objects 101 that are configured to allow user on-line interactions. Example user objects 101 include physical devices, such as a laptop 102a and a smart phone 102b. Each physical device can also be associated with any suitable number and types of software objects or applications, such as browser applications. For instance, laptop 102a has applications 104a and 104b, while smart phone 102b has applications 106a and 106b. In general, a software object or application is configured to allow the user to interact through the associated physical device with various on-line content, services, or applications.

Devices that are described herein may include any number and types of physical and/or virtual devices, such as smartphones or other mobile devices including browsers and/or apps, desktop or laptop computer including browsers, interactive television systems including browsers and/or apps, tablets, smart watches, wearable devices, etc. The term "device" is used herein to refer to the physical device itself or the software module (e.g., app or browser software) through which such physical device communicates with and is identified by other devices or servers via a computer network.

A user may use these devices through any number and type of devices and computer networks, such as through a wireless or cellular network (or a plain telephone system network or PTSN) and one or more wide area (WAN) and local area networks (LAN) networks. A user may also use a device via a Bluetooth connection to a computer that is connected to a network. There are any number and type of device and network configurations through which a device may be used by one or more users. In general, various users may access one or more services or applications on one or more server systems through one or more networks through any suitable type of devices.

Marketing campaigns often rely on the collection and tracking of user profile and event data for specific users. There are various ways to collect and manage user data. As users interact with various services using various applications on their devices, these services may anonymously assign user identifiers (IDs) for such users. For example, an on-line application may assign a random string as a user ID to a particular user that interacts with such application or web site (e.g., such as accessing a web page), and the assigned user ID is stored as part of a "cookie" on the particular user's device. A user ID may also refer to any identifier for uniquely identifying a particular user or device, such as a device ID or any unique fingerprint of the user, etc.

A first party cookie can generally take the form of a small piece of data, script, or code that is sent from a website that a particular user is accessing and stored in such particular user's browser. Cookies that originate from a different source than the top website domain that the user is currently accessing are referred to as $3^{rd}$ party cookies. For both $1^{st}$ or $3^{rd}$ party cookies, each time the user for which a cookie has been stored interacts with the application or web site that is associated with the stored cookie, the browser can then send the cookie back to the server from which the website or application is being accessed. The receiving server can also forward the cookie along with other event data pertaining to the user's interaction with the website or application to one or more third parties with whom the particular receiving server has been configured to share cookie and corresponding user data. The event data may pertain to a user's on-line activities, such as impression views, clicks or conversions. Each cookie may also be associated with user profile data, which pertains to one or more user characteristics, e.g., input by the particular user or that has been determined based on user on-line activities. Each cookie may also be associated with its user profile and event data via a data store, which is managed by a user data management system as described further herein.

A cookie and associated user ID can be lost if a user replaces their device or browser or deletes cookies from his/her device. On average, cookies tend to last about 1 month. Additionally, a user may lose their cookie after an advertisement is served. In sum, user event and profile data may become disassociated from a cookie due to cookie expiration or deletion. Content publishers or browsers may also be configured to disable use of 3$^{rd}$ party cookies so that cookies that do not originate from the top domain that the user is accessing will no longer be downloaded to the user's device or browser. Additionally, browsers may potentially be reconfigured or updated to disable 3$^{rd}$ party cookies by default, which a user is unlikely to enable.

Certain aspects of the present invention track fingerprint data for each user as such user interacts with various services. The historical fingerprint data for users who have been unambiguously identified can later be used to detect users who are no longer associated with a cookie, but still are associated with the same fingerprint data.

Fingerprint data for a particular user's on-line interactions can generally be represented by two dimensions: a physical device dimension 108*a* and an application dimension 108*b*. Each dimension may include any number of variable values or states that can be utilized as fingerprint data. For example, fingerprint data may include an IP (Internet Protocol) address, MAC (media access control) address, application signature or identifier (e.g., browser identifier), application details and context, geographical location data, content context, such as site URL (universal resource locator) and site category, etc. Application details and context may include the browser plugins that are installed in an application browser, system fonts that are installed, system time zone (TZ), system clock drift, network parameters, such as Wi-Fi ID or http settings, etc.

As described further below, fingerprint data may not include enough information to distinguish each particular user as unique. That is, each set of fingerprint data may be associated with multiple users, unlike physical fingerprints that are unique to each individual. Certain embodiments of the present invention include techniques for determining which user to assign to a particular set of fingerprint data when such fingerprint data is initially associated with more than one user.

Figure 2:
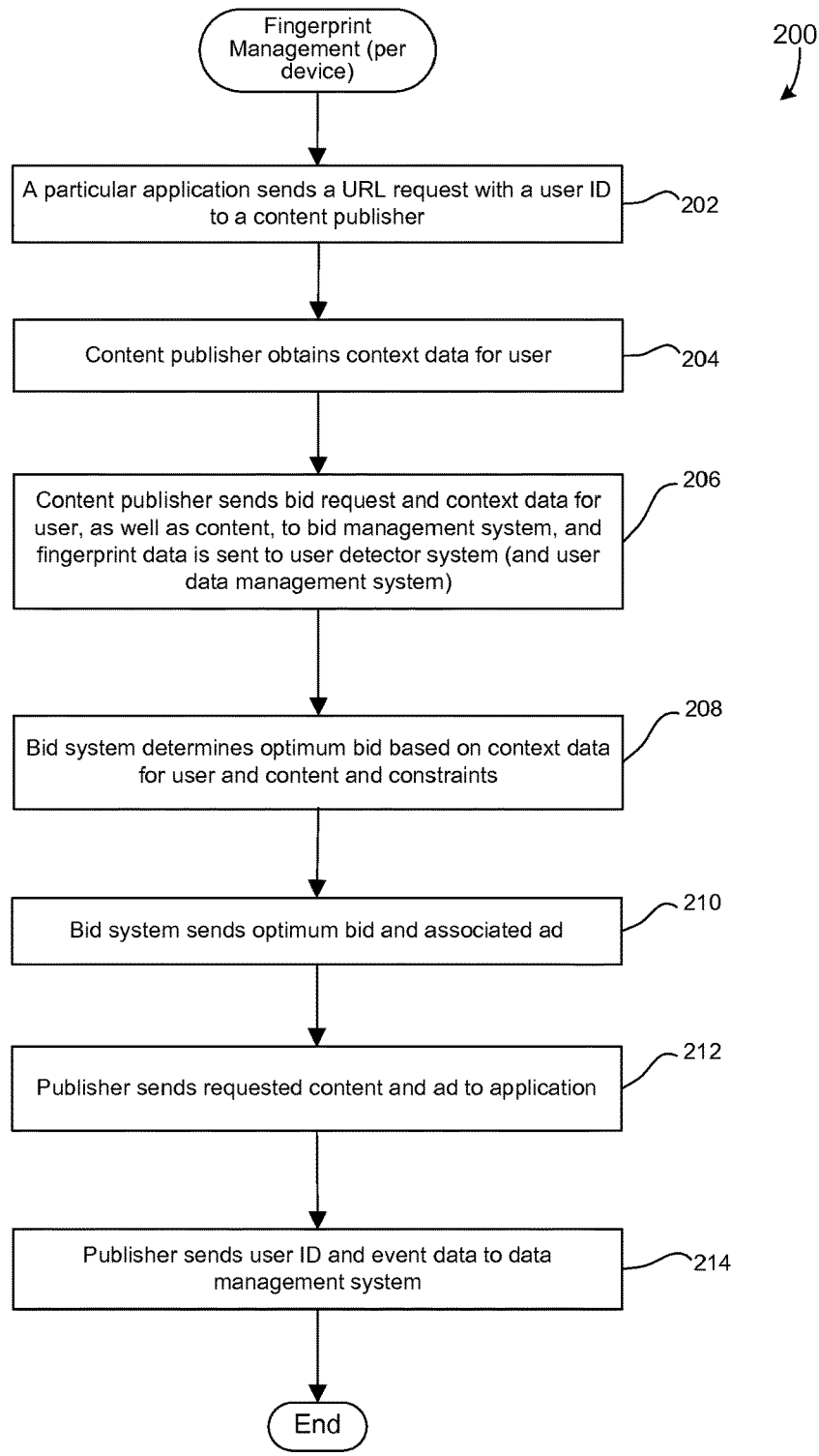
FIG. 2 is a flow chart illustrating a fingerprint management procedure in accordance with one embodiment of the present invention.
Figure 3:
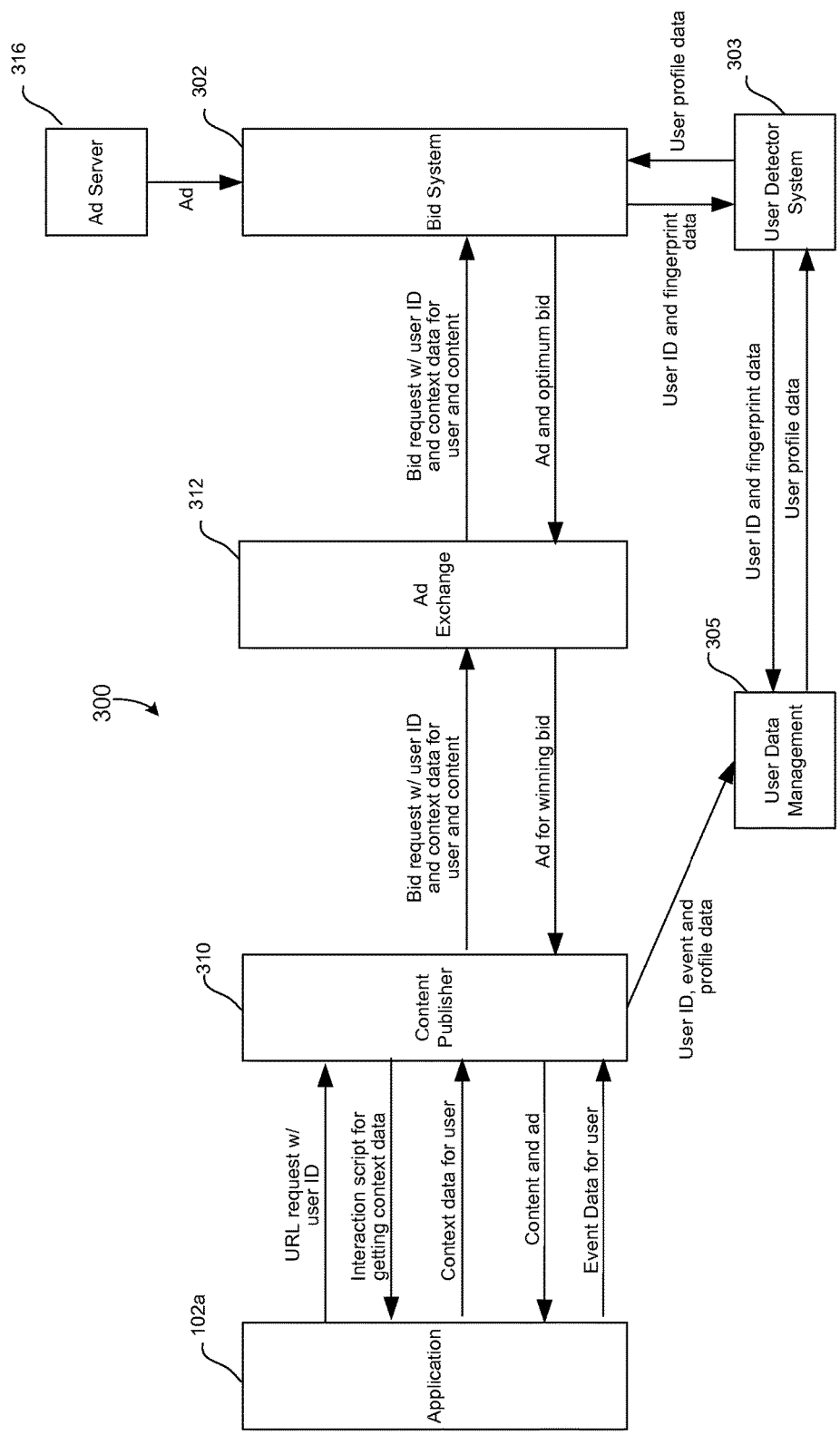
FIG. 3 is a communication diagram for collecting fingerprint data for a particular user in accordance with a specific implementation of the present invention.

Fingerprint data is first collected as various users who are unambiguously identified interact with various online content and services. For instance, fingerprint data is collected for users who have associated cookies. Any suitable techniques may be utilized for obtaining fingerprint data for a particular user. FIG. 2 is a flow chart illustrating a fingerprint management procedure 200 in accordance with one embodiment of the present invention. FIG. 3 is a communication diagram for collecting fingerprint data for a particular user in accordance with a specific implementation of the present invention. FIGS. 2 and 3 will be described together. Fingerprint management may be initiated when a particular application 102*a* sends a URL request with a user identifier (ID) to a content publisher 310 in operation 202 of FIG. 2. For example, a user requests a particular webpage through a particular browser for which a cookie has been downloaded.

The content publisher 310 may then obtain context data for the particular user in operation 204. The content publisher 310 may obtain context data by any suitable technique. For instance, some context data may be obtained in the URL request. Context data that is obtained from the URL request may include an IP and MAC address, browser ID, application ID, browser user-agent, device identifiers, etc. When the user accesses the URL, the content publisher may also send a content response that includes an interaction script in any supported programming language, such as JavaScript, that executes and obtains context data for the particular user from the requesting application 102*a* and/or associated physical device. The obtained context data for the user may include any suitable data pertaining to the user, application, or associated physical device. For instance, the context data may include geographical location data that specifies zip code, city, country, or longitudinal and latitudinal data, installed fonts in the browser, list of applications installed on a device, SSL session ids, proxy server, primary DNS's (domain name servers), etc. The executing script also generally sends this context data for the user back to the content publisher 310.

Upon request, publishers may provide any suitable type of displayable, executable, audible, or visual media content to users/audience via a user's device or on the publisher's device or system. For example, media content may include videos, music, text, games, etc. Publishers may provide various categories of content, such as news, entertainment, educational, finance, sports, travel, etc. In a specific implementation, publishers provide media content, such as web pages, from server devices to client devices that are accessible by audience members/users. Example client devices include tablet computing devices, laptop computing devices, personal digital assistant (PDA) devices, mobile phones (e.g., smart phones), desktop computer, televisions, wearable computers, household devices, etc. Each client device may be configured with any suitable hardware and/or software (e.g., browsers and browser add-ins plug-ins, operating systems for downloading and execution of apps on mobile devices) that operate in cooperation with the publisher devices/systems for receiving and presenting media content.

Prior to providing requested media content to the requesting user's application 102*a*, the publisher 310 may also sell one or more ad spaces with respect to such media content. Advertisers at the demand side have ads to place with publisher-provided media content. In general, what is actually bought (demanded) and sold (supplied) is a tiny fraction of the attention of online users (the audience in the advertising terminology) as they obtain media content from or on publishers' sites. For instance, an advertiser pays to have an ad placed in an ad space of a particular web page that is sold by a publisher. Although the illustrated system 300 and procedure 200 are described with respect to one or more ad spaces in a web page, the processes may be implemented for other types of ad spaces in other types of media, such as mobile device apps, games, coupons, videos, etc.

Referring back to the illustrated example, the content publisher 310 may send a bid request and the context data for the user, as well as for the content, to one or more bid management systems, such as bid system 302, in operation 206, for example, via a ad exchange system 312. The context data for the content may include the site URL and category, by way of examples. The bid system 302 may also send a portion of the context data for the user in the form of a fingerprint vector to a user detector system 303 in operation 206.

The user detector system 303 may generally be configured to manage fingerprint data and determine unique users based on fingerprint data as further described below. The user detector system 303 may be integrated with the bid system 302 or any other one or more components of system 300.

Additionally, fingerprint management may be handled by a separate user data management system 305 that is configured to collect various types of user on-line data. In the illustrated example, the data management system 305 receives each user ID and its associated fingerprint data, as well as user profile data for such user ID, as further described below.

The bid request may be sent to one or more bid management systems via an advertisement exchange system 312. The ad exchange system 312 generally runs an auction to determine a price of a match between an ad and a web page.

In essence, ad exchanges are the markets providing mechanisms for facilitating bidding processes between the demand and supply sides. The ad exchanges may be implemented on any suitable number and type of computing devices or servers.

The bid management system 302 may be generally configured to manage advertising campaigns on behalf of advertisers, e.g., via ad server 316, although some advertisers may also work directly with ad exchanges. Given a user requesting a particular web page, a bid system 302 is able to find the best ad for the particular user for which a bid request has been sent. The best ad may be selected from the ads managed by the bid system 302. For each ad selected, various constraints (mostly selected by the advertisers, but some by the ad exchange, the publisher, and the bid system) are met.

Advertisers who work with the bid system 302 may provide campaign parameters or specifications to the bid system 302. The advertisers may specify any suitable campaign parameters for running a particular ad campaign. For each campaign, an advertiser may specify at least a budget, an ad, a goal, and a set of constraints, sometimes referred to as targeting or contextual constraints. An ad campaign's budget may be specified to be spent over a given time period, sometimes referred to as a budget schedule.

For a branding type campaign, the idea may be to reach as many unique target users as the campaign budget affords at a constant cost per impression. This goal may be expressed as CPM, the cost per mille or one thousand impressions. For a performance type campaign, the advertiser may wish to reach as many unique users as the campaign budget affords, but to do so while keeping within certain performance goals. The performance goals may be expressed as CPC or CPA, the cost per click or the cost per action or conversion, respectively, although there may be other performance goals depending on the media content type, e.g., cost per engagement for a video advertisement. The goal associated with a segment of users may reflect the value of reaching those users for the advertiser. In advertising terminology, the part of the campaign customized to this segment of users is sometimes called a package.

An advertiser may also specify user targeting constraints for an ad campaign. In general, targeting constraints may specify what kind of users to reach on what kind of media content, how long to run the campaign, etc. A single user constraint can serve to partition a set of users into user segments that include users who satisfy the constraint and users who do not. In general, constraints can be based on any combination of characteristics from a particular user's profile, a particular media content profile, or other parameters that are obtainable for a particular ad request. Example constraints may pertain to user demographics, user browsing history, user geographic location data, media content categories, ad or ad space characteristics, user contextual parameters (e.g., weather, time of day, stock market indexes, etc.), advertiser categories, etc. In general, user contextual parameters may include any contextual parameter that may affect a user or advertiser's behavior.

Referring back to the illustrated example, the bid system may determine an optimum bid based on the context data for the user and content and constraints in operation 208. The bid management system 302 may filter ads based on whether the current bid request's context data meets associated ad constraints, and then determine bids for such filtered ads. A bid request with a user ID may generally be associated with user demographic, as well as browsing history data. User demographic and browsing history data may be obtained for a particular user ID from various user data management systems, such as 305, and then used to filter the ads based on whether the user demographics and browsing history data meets the ad constraints. The bid system may select the optimum bid and its associated ad from the bids that are determined for the filtered ads.

The bid system 302 may then send the optimum bid and associated ad (or a reference to the ad's location, such as ad server 316) to the content publisher 310 through the ad exchange 312 (if the optimum bid from the bid system is the most optimum bid from other optimum bids received at the ad exchange from other bid systems) in operation 210. The bid system 302 may also send a script for obtaining additional fingerprint context data, along with the optimum bid and associated ad, in operation 210. In an example implementation, the script is written in a JavaScript format. Additional fingerprint context data may include browser plugins that are installed in an application browser, system fonts that are installed, system time zone (TZ), system clock drift, network parameters, such as Wi-Fi ID or http settings, application installed in the device, operating system version on the device, etc. In an alternative or additional embodiment, the script can be sent separately from the bid response or after a bid is won. For example, the publisher can contact the user detector system directly to obtain the script and send such script to the user. Several embodiments for obtaining fingerprints are further described in U.S. patent application Ser. No. 14/524,916, filed 27 Oct. 2014 by Ali Dasdan et al., which application is incorporated herein by reference in its entirety. The content publisher 310 may then send the requested content and ad to the requesting application 102a in operation 212.

A user ID in the form of a cookie may have also been downloaded to the user's device. Mappings between user ID's and associated user on-line events may also be tracked. For instance, as the user interacts with the particular content or ad, the publisher 310 may send user ID and event data to the data management system 305 in operation 214. The publisher 310 may also consecutively or independently collect user profile data for such particular user, and the publisher 310 sends such user profile data and user ID to the user data management system 305.

FIG. 4A illustrates a simple data structure 400 that is representative of users and their associated user data. As shown, the table 400 includes a column for a user ID 402. The user ID 402 may be an anonymized and unique user identifier that is generated by the device, a service, advertiser, or a bid management or demand side platform (DSP). Other user identifying data may also include data that pertains to a unique device identifier and a device type, user login, email address, etc.

The table 400 may also include any number of a profile attributes columns 404, e.g., a gender attribute 404a and age attribute 404b. As shown, user U1 is associated with a gender attribute that is specified as female (F) and an age of 33, while users U2-U5 are not associated with a specified gender. Similarly, user U2 has an age attribute of 22, while user U3 has an age attribute of 45. Age attributes are more commonly indicative of age ranges. Although only two user attributes types are illustrated, each user identifier may be associated with numerous types of user attributes.

The attributes for each user ID may include any characteristics that was, is, or can be associated with the particular user u. To protect a user's privacy, attributes data may be stored with an anonymized type of user ID, such as an arbitrary or randomized identity, rather than the user's actual name, specific residency, or any other type of user identifying information. Examples of attributes data for a particular anonymized user u may include descriptive data, such as personal or professional interests, employment status, home ownership, knowledge of languages, age, education level, gender, race and/or ethnicity, income, marital status, religion, size of family, field of expertise, residential location (country, state, DMA, etc.), travel location, predictive data, such as likelihood to consume content or perform an activity, such as clicking on an ad, visiting a page or purchasing a product or service, in the near future, etc.

The attributes data of user u may also include contextual data, such as where the user is currently located, the weather at such location, current events at such location, etc. For instance, attributes data may include GPS (global positioning satellite) or access point location data for the user u at various points in time, and other contextual data may be scraped from other databases, such as a web site for weather, time of day, or entertainment event for a user's location.

User ID's may also be associated with events data 406, including impression data 406a (e.g., impression identifier and time stamp data that is associated with a particular impression that was served to the user) and user interaction indicator 406b that specifies various interactions that the user had with respect to the particular impression and a time at which such interaction occurred. Interactions data may include clicks, downloads, site visits, mouse overs, video/audio play (or pause, forward, rewind, etc.), conversions, an engagement heat map, view based actions, etc. A heat map may illustrate a quantitative level of activity with respect to an impression or other content.

In the illustrated example, user U1 may be associated with impression data specifying an impression identifier "Imp1" at timestamp "ts1" and a corresponding "click" interaction at timestamp "ts2", while user U2 has also been presented with impression "imp1" at timestamp "ts3" and had a related conversion activity at timestamp "ts4." The user activity information may also include any suitable one or more metrics, such as count, absolute or relative value, average, mean, frequency, time duration, etc.

Other events data, besides data pertaining to impressions, may pertain to engagement activity 406c in which the associated user has engaged at a particular time. For example, marketing engagement may include an advertiser or marketer providing particular content on a product site so as to engage particular audience segments in various activities (such as publications, surveys, discussions, etc.). The interaction data may also include browsing history information, such as pages visited, amount of time per page viewing, links clicked on, searches performed, actions or interactions taken, amount and type of purchases made, etc. The browsing history information may be expressed using any suitable one or more metrics, such as count, absolute or relative value, average, mean, frequency, timestamp, time duration, etc. As shown, user U4 engaged with content1 at timestamp ts5, while user U5 engaged with content2 at timestamp ts6.

As the device receives more impressions or engages in various marketing activities or content, multiple entries may be generated for the multiple impressions or engagements.

Although the illustrated user data table 400 shows a single entry for each user ID that includes user profile data and/or activity data for a single impression or engagement event, other data representations are contemplated. For example, one or more user entries for a particular user ID may indicate one or more user profile attribute characteristics. Likewise, one or more user entries for a particular user ID may indicate one or more impression or engagement attribute data sets. That is, each impression's or engagement event's data may be listed in a separate corresponding user ID entry or listed together in a single user ID entry. The user profile attribute data entries may also be separated from the impression/engagement data entries.

The user attributes may also include a fingerprint vector 404c. As described above, multiple users may share a same fingerprint, which is stored by a user data management system 305 by way of example. As shown, multiple users have a same fingerprint. For instance, users U1, U4, and U5 have a same fingerprint vector fv1.

In general, a fingerprint vector may contain any suitable characteristics pertaining to the user, user's device, or user's application. A fingerprint vector for each user request or action may be determined in any suitable manner. The fingerprint vector may generally include a vector of characteristic values for different user, device, or application attributes. Continuous attribute data may be optionally binned into categorical data values. In general, attribute values can be bucketized. In one specific implementation, the age attribute values may be binned into the following categories: under 18, 18-25, 26-40, 41-55, and 56 and older. In the example of FIG. 4A, user U1, U2, and U3 have their age values of 33, 22, and 45 binned into the age categories 26-40, 18-25, and 41-55, respectively.

Any suitable type of continuous attribute may be binned. Examples include binning specific incomes into income ranges, binning specific ages into age ranges, binning specific conversion amounts from purchase transactions into currency ranges, binning specific customer lifetime values into customer lifetime value ranges, etc. The particular ranges or categories may be selected based on any particular factor. In one embodiment, marketers select ranges for particular attributes, such as age and income, so that the users with the particular range tend to result in similar success metrics (e.g., user click or action rate for a particular ad or product).

As noted above, a user or user device that is currently requesting content may no longer have an associated unambiguous user ID. For instance, the user may have deleted his cookies. Thus, such a user device may now only have an associated fingerprint vector, which may be associated with many user ID's. However, it is desirable to return only one user ID with each on-line user interaction. One reason for identifying a single user ID is that one cue for real-time bidding process is information about the user, which is typically stored in association with particular user ID's. Accordingly, techniques of the present invention include several mechanisms for selecting a single user ID from a plurality of user ID's associated with a currently received fingerprint vector.

Figure 5:
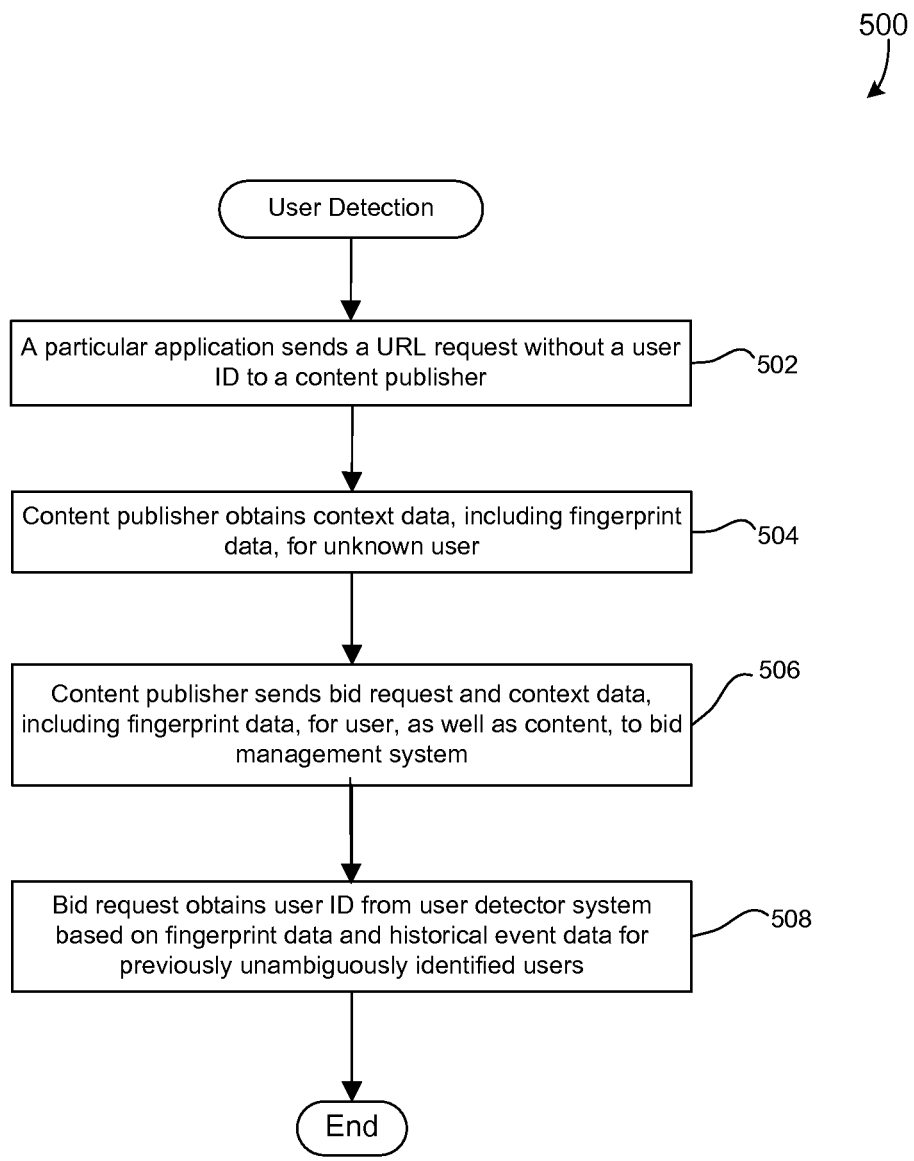
FIG. 5 is a flow chart illustrating a user detection procedure in accordance with one embodiment of the present invention.
Figure 6:
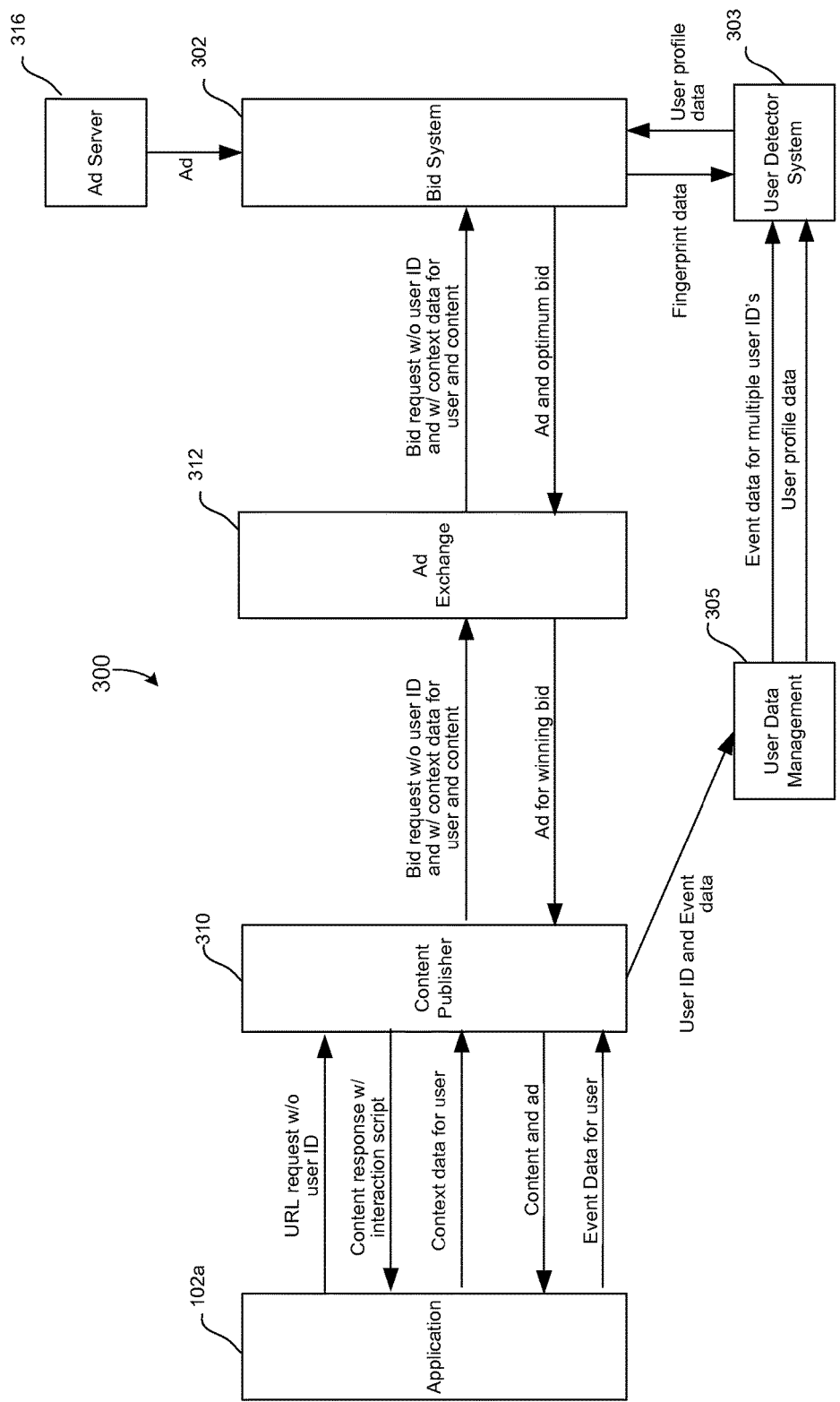
FIG. 6 is a communication diagram for a user detection procedure in accordance with one example embodiment.

FIG. 5 is a flow chart illustrating a user detection procedure 500 in accordance with one embodiment of the present invention. FIG. 6 is a communication diagram for such procedure in accordance with one example embodiment. Application 102a sends a URL request without a user ID to content publisher 310 in operation 502. For instance, the request does not contain a cookie. The content publisher 310 obtains context data, including fingerprint data, for the unknown user in operation 504. The content publisher 310 then sends a bid request and context data, including fingerprint data, for the user, as well as the content, to the bid management system 302 in operation 506.

The bid management system 302 may then obtain a single user ID for the particular fingerprint data, for example, from the user detector 303 based on the fingerprint data and historical event data for previously unambiguously identified users in operation 508.

Any suitable technique may be utilized to select a user ID from among a plurality of user ID's associated with a particular fingerprint vector. In general, the behavior associated with user ID's can be modeled based on historical user data that were collected for user ID's that were unambiguously determined. The historical user data includes event data for one or more on-line user events that have occurred for each user ID. The historical user data also specify a plurality of fingerprint vectors of characteristic values that are each associated with specific ones of the user ID's. It is noted that the historical user data may likely include fingerprint vectors that are each associated with a single user ID.

When a fingerprint vector that is ambiguously associated with multiple user ID's is received, a probability of each user ID being the correct user ID may then be determined. Said in another way, the probability of each user ID is determined as a function of the current fingerprint and the historical data sets. For example, a particular fingerprint that is associated with user U1, U2, and U3 is received. The probability that the particular fingerprint belongs to user identifier U1 may then be determined; the probability that the particular fingerprint belongs to user identifier U2 is determined; and the probability that the particular fingerprint belongs to user identifier U3 is determined. It may then be determined that the particular fingerprint belongs to the user ID having the highest probability. A user ID being correct means that the user or user device that is currently making a content request previously was unambiguously associated with such correct user ID.

The probabilities of whether a user identifier is the correct user identifier for a current fingerprint vector may be determined based on any suitable historical data. In certain embodiments, the user identifiers that are associated with the current fingerprint vector may be sorted based on frequency of events, and the user identifier with the highest event frequency is selected. Frequency of a user ID, f, may be defined as the number of events for which event data is registered or noted during a specified period of time for that user ID. Frequency ties may be resolved based on recency values for the tied user identifiers. Recency of a user ID may be defined as, $r=t-t^o$, where t is the present time and $t^o$ is the last time that the user ID is serviced by the system (e.g., the last time event data was collected for the user ID).

FIG. 4B is a simplistic table 430 used to illustrate associating user ID's (432) with current frequency values (434) and recency values (436) in accordance with one example implementation of the present invention. As event data is collected for each user ID, a frequency and recency parameter can be updated. For example, a current frequency count may be incremented each time a user ID is associated with an on-line event. Likewise, the amount of time since the last event for such user ID may also be noted. For example, user ID U1 has a current frequency count of 5, which corresponds to the user ID U1 participating in 5 on-line events, such as viewing an impression, clicking on an impression, etc. User ID U1 also has a recency value of 5 seconds since the last event in which the user ID U1 has participated.

In one example, a fingerprint vector fv1 is received, and such fingerprint vector may be determined to be previously associated with multiple user ID's. FIG. 4C is a table 440 that associates feature vectors with user ID's in accordance with a specific example implementation of the present invention. As shown, fingerprint vector fv1 is associated with users ID's U1, U3, and U4. Based on frequency counts for such users as shown in FIG. 4B, user ID U4 is selected since it is associated with a highest frequency count of 1001.

A technique that forms a priority queue that prioritizes the user ID's based on their frequency and resolves the ties by recency has the advantages of being straightforward and efficient. One disadvantage, however, may be that if a user is slightly more frequent than the other users for a particular fingerprint vector, then such user will be selected all the time and will dominate the other users very fast. Choosing both the frequency and recency as keys for the priority queue has the same disadvantage as choosing only frequency as the key, in addition to the fact that a more recent user tends to not to be the most probable user.

Figure 7:
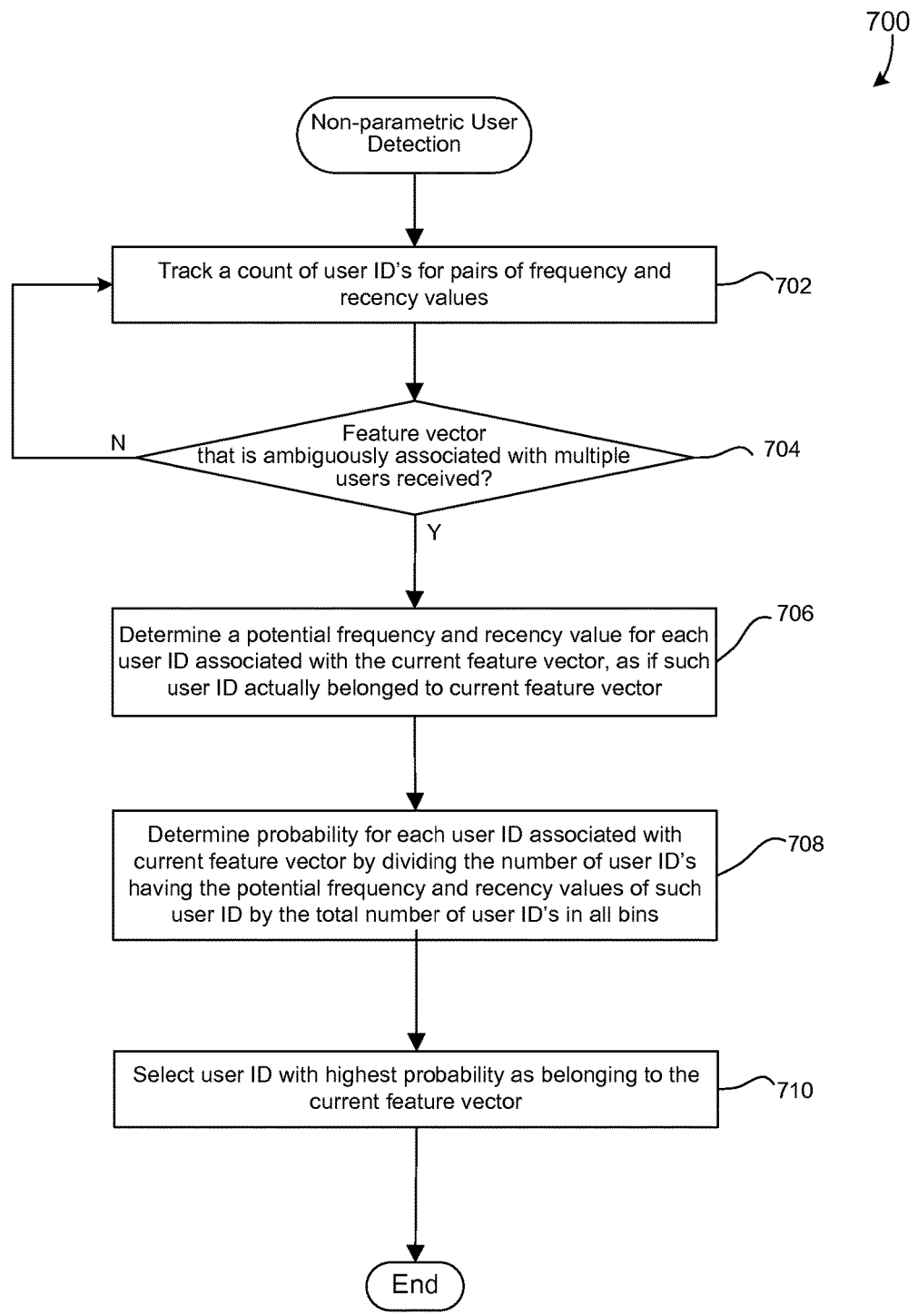
FIG. 7 is a flow chart illustrating a user detection process that utilizes global frequency and recency historical data in accordance with a second implementation of the present invention.

FIG. 7 is a flow chart illustrating a user detection process 700 that utilizes global frequency and recency historical data in accordance with a second implementation of the present invention. This approach utilizes a non-parametric solution, such as histogram, for determining probability of user ID presence based on the frequency and recency data collected for the entire set of user ID's. That is, the distribution of the joint probability of frequency and recency D(f, r) may be estimated by use of a vector quantization technique. For instance, the user ID's can be clustered into bins based on frequency and recency values. Vector quantization algorithms may include any clustering algorithm such as k-means or a simulated annealing method that incrementally reduces the sensitivity of the cluster centers to the addition of new frequency and recency intervals. This way a combined range of frequency and recency may be associated with each bin that consequently includes the number of users that fall into the determined intervals defined by the bin.

The users that are considered in this estimation preferably include only legitimate and active users. In a high throughput system that offers its service to virtually anyone on the Internet, many profiles are created for users that cannot be tracked using a cookie-based mechanism and, thus, they will be over-counted. This results in biasing the estimation towards the user with a single event. Accordingly, the estimation may be limited to users with associated events above a predefined threshold number (e.g., 1). The minimum event count threshold may be applied to the total event count that a user identifier currently has at the time of applying a filtering process or applied to an event count per time period (or event frequency). For instance, user ID's and their associated recency and frequency values that are associated with less than 10 associated events every 3 days may be filtered out. Other techniques for filtering user ID's may be applied, such as the techniques described in U.S. patent application Ser. No. 14/248,085, filed 8 Apr. 2014 by Joshua M. Koran, which application is incorporated herein by reference in its entirety.

In the illustrated embodiment, a count of user ID's may be tracked for each pair of recency and frequency values in operation 702. In a specific implementation, a two dimensional frequency and recency histogram may be constructed for determining the probability of seeing a particular user (e.g., user X).

FIG. 4D is an example table 450 for tracking user ID counts for pairs of recency and frequency range values in accordance with one embodiment of the present invention. Another way to represent such user ID counts would be a two dimensional histogram having both a frequency and recency dimension. In the FIG. 4D example, one dimension is a frequency range count 452, while the other dimension is a recency range 454 (seconds). Each bin could hold counts for a range of frequency and recency. For instance, a total of five user ID's have both a frequency range count of 1-5 and a recency of 1-2 second, while 100 user ID's have both a current frequency count of 6-10 and a recency of 9-10 seconds.

The frequency and recency bin counts can be used to determine probability of each user ID, from a set of multiple user ID's, belonging to a particular fingerprint vector. For instance, if a fingerprint vector, such as fv1, that is associated with users U1, U3, and U4 is received, probabilities may be determined for each user based on such user ID's frequency and recency values if such user ID belonged to the currently received feature vector fv1. In the illustrated embodiment, it may first be determined whether a fingerprint vector that is ambiguously associated with multiple users is received in operation 704. If such a feature vector has not been received, bin counts for frequency and recency pair values may continue to be tracked.

If such a feature vector has been received, a potential frequency and recency value for each user ID associated with the current feature vector, as if such user ID actually belonged to the current feature vector, may be determined in operation 706. For the fv1 example and using the frequency values in FIG. 4B, user U1 would have a frequency value of 6 (5+1); user U3 would have a frequency of 201; and user U4 would have a frequency of 1002. For the same fv1 example, a potential recency for a user can be calculated by subtracting the current time from the user's last event time (e.g., as represented in FIG. 4A). If the current time is 2:00 pm and the last event time for user U1 is 1:59:55 pm (represented as ts2 in FIG. 4A), user U1 would have a recency of 5 seconds if it belonged to fingerprint fv1. The recency values for U3 and U4 can be similarly determined.

The probability of each user ID associated with the current feature vector may then be determined by dividing the number of user ID's who are in the same bin as the potential frequency and recency values of such user ID by the total number of user ID's in all the bins in operation 708. In the illustrated example, user U1's potential frequency (6) and recency (5) are associated with 5 user ID's in the 6-10 frequency and 5-6 recency bin of the historical database of FIG. 4D. The probability of user U1 belonging to feature vector fv1 is 200 divided by the total number of users in all of the bins or 5+100+500+5+3+15+50+20+1+4+5+200+100+5+5+25+10+1+10+100+1+5+5, which equals 0.1688 probability for user U1. It is noted that the historical data would likely be binned into more bins than is shown in FIG. 4D. Probabilities may be similarly determined for users U3 and U4. The user ID that has the highest probability may then be selected as belonging to the current feature vector in operation 710.

In sum, a user ID count for each frequency f and recency r bin is updated as each user ID interacts with the on-line system. When a fingerprint vector that is ambiguously associated with multiple user ID's is extracted from a current on-line event, the size of the bin associated with each user ID can then be looked up based on such user ID's f and r. The probability of each user ID can then be determined for each user ID by dividing the lookup bin size for such user ID by the total size of the histogram. That is, all the historical events from all of the users are analyzed to estimate a probability for a particular user being associated with a current fingerprint vector.

Unfortunately, the above-described binning or non-parametric technique requires a lot of resources, such as memory and CPU, for tracking the counts for all the possible bins (e.g., FIG. 4D). In another approach, a parametric estimation may be used to determine probabilities for each potential user ID associated with a current feature vector. In this approach, it is assumed that the statistical behavior of the users does not change. Thus, one may utilize a parametric estimation for the user behavior to determine a representative distribution for each user ID.

In some cases, both the frequency and recency may follow a log-normal distribution. Depending on the system and analysis of users, the form of the distribution might change to Gamma or power law. The log-normal is merely used herein as an example of a suitable distribution and other distributions may be used. The particular distribution used will not change the procedure and only change the sampling process. In one embodiment, a mixture of log-normal distributions can be trained to estimate the distribution of the joint probability of frequency and recency:

$$D(f, r \mid \pi, \mu, \sigma) = \sum_{k=1}^{K} \pi_k \ln N(f, r; \mu_k, \sigma_k)$$

where $\mu$ is the mean; and a is the standard deviation. Since the parametric model for estimating probability is a log-normal distribution, this model can be described almost completely with the mean and variance values, or any other suitable combination of statistical parameters. In sum, a probability of each potential user ID can be determined by training a model to estimate the distribution of the recency and frequency historical data and then inputting such user ID's recency and frequency value into the model, which then outputs the estimated probability for such user ID.

The training of the model can be done through expectation maximization, Gibbs sampling or any other mixture training algorithms. These methods can efficiently and accurately estimate the required parameters.

Regardless of the approach for determining which user ID is associated with a currently received fingerprint vector, the determined user ID may then be used to obtain user profile data that is associated with such user ID. The user profile data can then be used for targeting of advertisements or other content to the current user.

Certain embodiments of the present invention allow tracking of users who have not opted out from the system, but cannot be identified due to system limitations or settings. Additionally, certain embodiments can provide a connection between cookie-based tracking and cookie-less tracking mechanisms.

Figure 8:
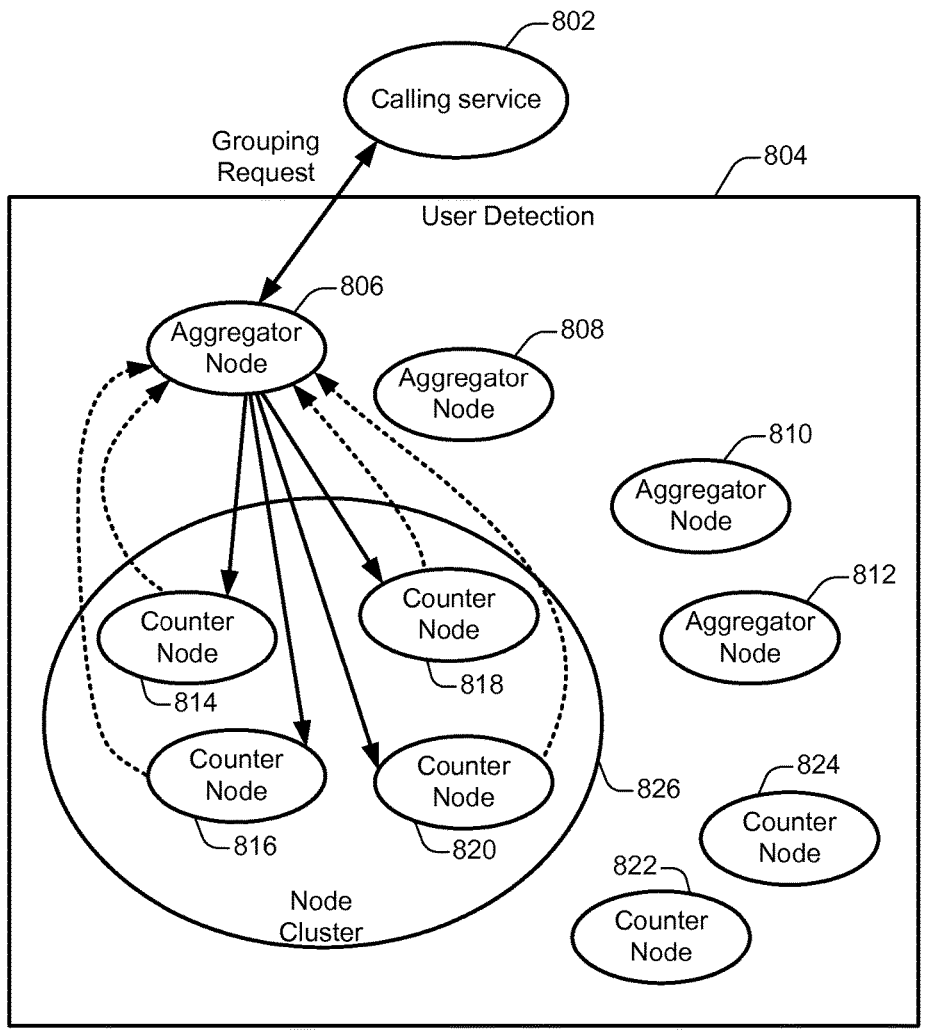
FIG. 8 illustrates an example of a system for executing clustering queries, configured in accordance with one or more embodiments.

The disclosed techniques of the present invention may be implemented in any system or any suitable combination of software and/or hardware, such as distributed network of processors. FIG. 8 illustrates an example system, for collecting historical user data and detecting user ID's, configured in accordance with one or more embodiments. The system illustrated in FIG. 8 includes a calling service 802 that communicates with a user detection system 804 (and/or user data management system). The user detection system 804 includes aggregator nodes 806-812 and counter nodes 814-824. Several of the counter nodes are included within a counter node sub-cluster 826.

According to various embodiments, a node may be a server having a processor and memory. Alternately, different nodes may be implemented on different processors within a server.

In order to handle a larger user data size, the user data may be distributed over a set of servers. Since the queries are easily parallelizable, overall system latency may be significantly reduced. Also, the results from many queries over a single sample may be calculated simultaneously.

According to various embodiments, the calling service 802 represents any system configured to transmit a query request to the user detection system. For instance, the calling service 802 may be a system configured to receive request information from user detection systems and formulate user probability queries based on the request information. The user detection system 804 includes a collection of counter nodes and aggregator nodes that together can receive a query request, execute the query request, and return a result.

The aggregator nodes 806-812 receive requests from calling services and coordinate query activity among the counter nodes. In some embodiments, each clustering request is wrapped in a collector and added to a queue. When an aggregator begins processing a query request, the aggregator node selects a subcluster of counter nodes to execute the request. Then, the aggregator node distributes the query request among the selected sub-cluster of nodes.

According to various embodiments, the aggregator node receives partial results from the counter nodes and aggregates the partial responses into a final result. For instance, each counter node may perform various tasks with respect to the data sets that are present on the counter node that satisfy the query parameters. For example, each node may count user ID's for each bin, determine probabilities of each user ID, etc. In particular embodiments, this distinction of responsibilities may allow the system to process an increasing amount of data while adding only a relatively small constant overhead of network communication and the increased time of partial report aggregation as new servers are introduced.

When an aggregator node receives partial responses from the counter nodes, the aggregator node may perform any necessary calculations to process the partial responses. For instance, the aggregator node may calculate probability values or order frequency results based on results received from different nodes. The calling service may then complete the clustering based on the results received from the aggregator nodes. In order to combine the cluster results generated from the various nodes, the clustering model for how to weight each attribute and how each cluster was defined would be preferably determined first in certain embodiments.

According to various embodiments, user ID binning (or other historical data analysis process) may be performed periodically. For instance, a dataset may be updated with new user data, and a new process may be initiated to reflect the updated dataset. The resulting user data may then be stored on a network-accessible file system that can be accessed from the network nodes, such as the counter nodes within the user detection system. For instance, the historical user data analysis results may be stored on a Hadoop File System (HDFS).

A "zookeeper" system may supervise the distribution of the data sets among the counter nodes and may notify each counter node when a new data set is available for that counter node. According to various embodiments, the user data may be divided into per server sub-samples. The sub-samples may have similar user data, but different observations, so that different counter nodes store different portions of the user data.

Figure 9:
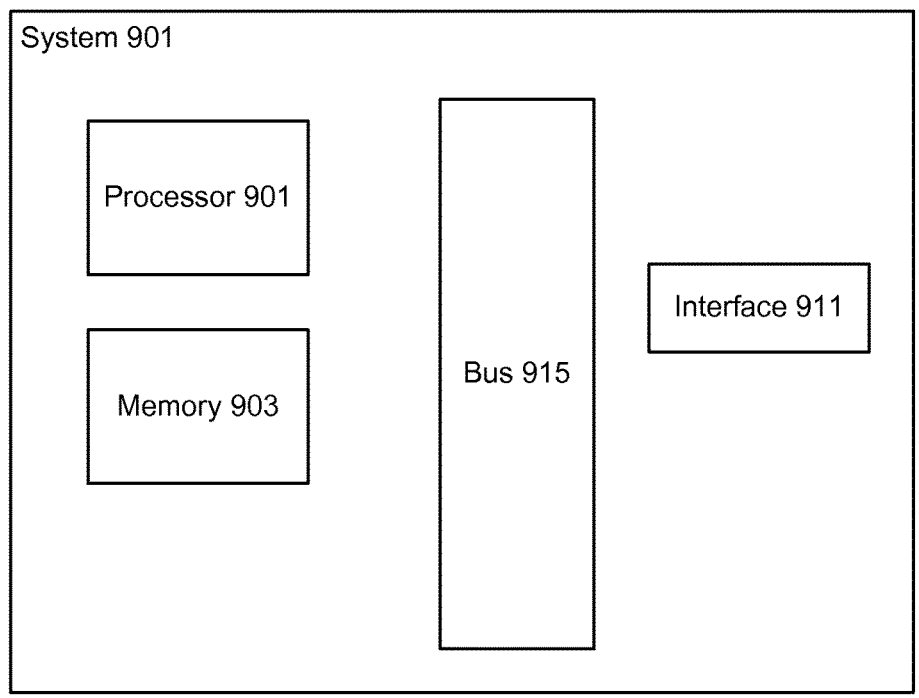
FIG. 9 illustrates an example of a server, configured in accordance with one or more embodiments.

FIG. 9 illustrates one example of a server. According to particular embodiments, a system 900 suitable for implementing particular embodiments of the present invention includes a processor 901, a memory 903, an interface 911, and a bus 915 (e.g., a PCI bus or other interconnection fabric) and operates as a counter node, aggregator node, calling service, zookeeper, or any other device or service described herein. Various specially configured devices can also be used in place of a processor 901 or in addition to processor 901. The interface 911 is typically configured to send and receive data packets over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. Although a particular server is described, it should be recognized that a variety of alternative configurations are possible.

Because such information and program instructions may be employed to implement the systems/methods described herein, the present invention relates to machine readable storage media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that are specially configured to store and perform program instructions, such as ROM and RAM. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method for identifying on-line users for advertisement or content targeting, the method comprising:
   in a user management mode,
      at a bid management system, for each of a plurality of users,
         receiving a first bid request from a publisher server, the first bid request including a user identifier (ID) and context data for the user and for content that is requested by an application on a device corresponding to such user,
            wherein the user ID is unambiguously associated with a hypertext transfer protocol (HTTP) cookie that is downloaded to the device;
         determining a bid for the first bid request based on the context data for the user and the content; and
         sending the bid to the publisher server, wherein the bid is sent with an associated advertisement that is transmitted to the application on the device corresponding to the user;
      at a user data management system, for each of a plurality of users
         receiving the user ID and at least a portion of the context data as a fingerprint vector corresponding to the user ID; and receiving event data associated with the user ID from the publisher server, wherein the event data includes user interactions with content and advertisements within the application; and distributing the plurality of user IDs corresponding to the plurality of users and associated event data among a plurality of counter nodes, each of the plurality of counter nodes storing a respective portion of the plurality of user IDs and associated event data;

in a user detection mode,
at the bid management system,
receiving a second bid request from the publisher server,
wherein the second bid request is generated in response to a request to access content by an application on a device corresponding to an unidentified user;
wherein the second bid request includes a current fingerprint vector that is not associated with an HTTP cookie and is ambiguously associated with two or more user IDs of the plurality of user IDs;

at a user detector system,
receiving the current fingerprint vector from the bid management system;
selecting a first user ID from the two or more user IDs associated with the current fingerprint vector to associate with the current fingerprint vector, wherein the first user ID is selected based on associated event data by:
transmitting, from an aggregator node to each of the plurality of counter nodes, a query request to group the plurality of user IDs into a plurality of bins based on corresponding frequency values and recency values determined from the associated event data;
at each counter node:
grouping the respective portion of user IDs into particular bins based on corresponding frequency values and recency values,
determining the total number of the respective portion of user IDs in each bin;
aggregating a plurality of responses to the query requests at the aggregator node, the plurality of responses received from the plurality of counter nodes, each response describing a grouping result of the query request for the respective portion of the user IDs and associated event data on the counter node;
for each user ID of the two or more user IDs, determining a probability that the user ID corresponds to the current fingerprint vector, wherein the probability is based on the ratio of the number of user IDs in the same bin as the user ID to the number of user IDs in all the bins; and
selecting a user ID of the two or more user IDs with the largest ratio as the first user ID; and
providing the selected first user ID to the bid management system to provide advertisements or content to the device corresponding to the unidentified user based on user profile data corresponding to such selected first user ID.

2. The method of claim 1, wherein the first user ID is selected based on a determination that the first user ID has a highest probability of being the correct user ID than a probability of the other ones of the two or more user IDs being the correct user ID.

3. The method of claim 1, wherein the first user ID is selected based on a determination that the first user ID has a highest probability of being previously unambiguously identified with a user or device from which the current fingerprint vector is received.

4. The method of claim 1, wherein for each user ID ambiguously associated with the current fingerprint vector,
the corresponding frequency value is determined by incrementing a current count of a number of events indicated by associated event data; and
the corresponding recency value is determined by calculating the difference between a first timestamp corresponding to the current fingerprint vector and a second timestamp corresponding to a previous event indicated by associated event data.

5. The method of claim 1, wherein the first user ID is selected by:
training a parametric model to estimate a distribution of joint probability of frequency and recency value for events associated with the plurality of user IDs in the associated event data; and
for each of the two or more user IDs associated with the current fingerprint vector, determining a probability of such user ID by inputting a recency and frequency value of such user ID into the parametric model, which outputs the selected first user ID.

6. The method of claim 5, wherein the training is performed by an expectation maximization process or a Gibbs sampling process.

7. The method of claim 1, wherein each of the fingerprint vectors pertains to a user, user device, or user application.

8. The method of claim 1,
wherein the second bid request is an advertisement bid request for an advertisement space in on-line content that is to be presented to the device corresponding to the unidentified user associated with the current feature vector,
wherein the method further comprises:
obtaining user profile and event data that is associated with the selected first user ID; and
providing a bid for an advertisement to be presented to the requesting user device corresponding to the unidentified user based on the obtained user profile and event data meeting specified targeting constraints.

9. A system for identifying on-line users for advertisement or content targeting, the system comprising: a bid management system, a publisher server, a user data management system, and a user detector system;
wherein in a user management mode,
the bid management system is configured to:
for each of a plurality of users,
receive a first bid request from the publisher server, the first bid request including a user identifier (ID) and context data for the user and for content that is requested by an application on a device corresponding to such user,
wherein the user ID is unambiguously associated with a hypertext transfer protocol (HTTP) cookie that is downloaded to the device;
determine a bid for the first bid request based on the context data for the user and the content; and
send the bid to the publisher server, wherein the bid is sent with an associated advertisement that is transmitted to the application on the device corresponding to the user;

the user data management system is configured to:
    for each of a plurality of users,
        receive the user ID and at least a portion of the context data as a fingerprint vector corresponding to the user ID; and
        receive event data associated with the user ID from the publisher server, wherein the event data includes user interactions with content and advertisements within the application; and
    distribute the plurality of user IDs corresponding to the plurality of users and associated event data among a plurality of counter nodes, each of the plurality of counter nodes storing a respective portion of the plurality of user IDs and associated event data;
wherein in a user detection mode,
    the bid management system is configured to:
        receive a second bid request from the publisher server,
            wherein the second bid request is generated in response to a request to access content by an application on a device corresponding to an unidentified user;
            wherein the second bid request includes a current fingerprint vector that is not associated with an HTTP cookie and is ambiguously associated with two or more user IDs of the plurality of user IDs;
    the user detector system is configured to:
        receive the current fingerprint vector from the bid management system;
        select a first user ID from the two or more user IDs associated with the current fingerprint vector to associate with the current fingerprint vector, wherein the first user ID is selected based on associated event data by:
            transmitting, from an aggregator node to each of the plurality of counter nodes, a query request to group the plurality of user IDs into a plurality of bins based on corresponding frequency values and recency values determined from the associated event data;
            at each counter node:
                grouping the respective portion of user IDs into particular bins based on corresponding frequency values and recency values,
                determining the total number of the respective portion of user IDs in each bin;
            aggregating a plurality of responses to the query requests at the aggregator node, the plurality of responses received from the plurality of counter nodes, each response describing a grouping result of the query request for the respective portion of the user IDs and associated event data on the counter node;
            for each user ID of the two or more user IDs, determining a probability that the user ID corresponds to the current fingerprint vector, wherein the probability is based on the ratio of the number of user IDs in the same bin as the user ID to the number of user IDs in all the bins; and
            selecting a user ID of the two or more user IDs with the largest ratio as the first user ID; and
        provide the selected first user ID to the bid management system to provide advertisements or content to the device corresponding to the unidentified user based on user profile data corresponding to such selected first user ID.

10. The system of claim 9, wherein the first user ID is selected based on a determination that the first user ID has a highest probability of being the correct user ID than a probability of the other ones of the two or more user IDs being the correct user ID.

11. The system of claim 9, wherein the first user ID is selected based on a determination that the first user ID has a highest probability of being previously unambiguously identified with a user or device from which the current fingerprint vector is received.

12. The system of claim 9, wherein
    for each user ID ambiguously associated
        the corresponding frequency value is determined by incrementing a current count of a number of events indicated by associated event data; and
        the corresponding recency value is determined by calculating the difference between a first timestamp corresponding to the current fingerprint vector and a second timestamp corresponding to a previous event indicated by associated event data.

13. The system of claim 9, wherein the first user ID is selected by:
    training a parametric model to estimate a distribution of joint probability of frequency and recency value for events associated with the plurality of user IDs in the historical user data; and
    for each of the two or more user IDs associated with the current fingerprint vector, determining a probability of such user ID by inputting a recency and frequency value of such user ID into the parametric model, which outputs the selected first user ID.

14. The system of claim 13, wherein the training is performed by an expectation maximization process or a Gibbs sampling process.

15. The system of claim 9, wherein each of the fingerprint vectors pertains to a user, user device, or user application.

16. The system of claim 9,
    wherein the second bid request is an advertisement bid request for an advertisement space in on-line content that is to be presented to the device corresponding to the unidentified user associated with the current feature vector,
    wherein the processor and/or memory are further configured for:
        obtaining user profile and event data that is associated with the selected first user ID; and
        providing a bid for an advertisement to be presented to the requesting user device corresponding to the unidentified user based on the obtained user profile and event data meeting specified targeting constraints.

17. At least one non-transitory computer readable storage medium having computer program instructions stored thereon that are arranged to perform the following operations:
    in a user management mode,
        at a bid management system, for each of a plurality of users,
            receiving a first bid request from a publisher server, the first bid request including a user identifier (ID) and context data for the user and for content that is requested by an application on a device corresponding to such user, wherein the user ID is unambiguously associated with a hypertext transfer protocol (HTTP) cookie that is downloaded to the device;

determining a bid for the first bid request based on the context data for the user and the content; and sending the bid to the publisher server, wherein the bid is sent with an associated advertisement that is transmitted to the application on the device corresponding to the user;

at a user data management system, for each of the plurality of users receiving the user ID and at least a portion of the context data as a fingerprint vector corresponding to the user ID;

receiving event data associated with the user ID from the publisher server, wherein the event data includes user interactions with content and advertisements within the application; and distributing the plurality of user IDs corresponding to the plurality of users and associated event data among a plurality of counter nodes, each of the plurality of counter nodes storing a respective portion of the plurality of user IDs and associated event data;

in a user detection mode, at the bid management system, receiving a second bid request from the publisher server, wherein the second bid request is generated in response to a request to access content by an application on a device corresponding to an unidentified user;

wherein the second bid request includes a current fingerprint vector that is not associated with an HTTP cookie and is ambiguously associated with two or more user IDs of the plurality of user IDs;

at a user detector system, receiving the current fingerprint vector from the bid management system;

selecting, a first user ID from the two or more user IDs associated with the current fingerprint vector to associate with the current fingerprint vector, wherein the first user ID is selected based on associated event data by:

transmitting, from an aggregator node to each of the plurality of counter nodes, a query request to group the plurality of user IDs into a plurality of bins based on corresponding frequency values and recency values determined from the associated event data;

at each counter node:

grouping the respective portion of user IDs into particular bins based on corresponding frequency values and recency values, determining the total number of the respective portion of user IDs in each bin;

aggregating a plurality of responses to the query requests at the aggregator node, the plurality of responses received from the plurality of counter nodes, each response describing a grouping result of the query request for the respective portion of the user IDs and associated event data on the counter node;

for each user ID of the two or more user IDs, determining a probability that the user ID corresponds to the current fingerprint vector, wherein the probability is based on the ratio of the number of user IDs in the same bin as the user ID to the number of user IDs in all the bins; and selecting a user ID of the two or more user IDs with the largest ratio as the first user ID; and providing the selected first user ID to the bid management system to provide advertisements or content to the device corresponding to the unidentified user based on user profile data for corresponding to such selected first user ID.

* * * * *